(12) United States Patent
Hughes

(10) Patent No.: US 9,297,402 B2
(45) Date of Patent: Mar. 29, 2016

(54) LOW ENERGY SCREWS FOR WOOD AND SIMILAR MATERIALS

(75) Inventor: Barry J. Hughes, Arden (GB)

(73) Assignee: Phillips Screw Company, Burlington, MA (US)

( * ) Notice: Subject to any disclaimer, the term of this patent is extended or adjusted under 35 U.S.C. 154(b) by 892 days.

(21) Appl. No.: 12/922,208

(22) PCT Filed: Mar. 16, 2010

(86) PCT No.: PCT/US2010/027455
§ 371 (c)(1),
(2), (4) Date: Mar. 24, 2011

(87) PCT Pub. No.: WO2010/135016
PCT Pub. Date: Nov. 25, 2010

(65) Prior Publication Data
US 2011/0164944 A1    Jul. 7, 2011

(30) Foreign Application Priority Data

May 22, 2009 (GB) .................................. 0908830.3

(51) Int. Cl.
| | | |
|---|---|---|
| F16B 35/04 | (2006.01) | |
| F16B 25/10 | (2006.01) | |
| F16B 25/00 | (2006.01) | |
| F16B 35/06 | (2006.01) | |

(52) U.S. Cl.
CPC ........... *F16B 25/106* (2013.01); *F16B 25/0015* (2013.01); *F16B 25/0047* (2013.01); *F16B 25/0057* (2013.01); *F16B 35/065* (2013.01)

(58) Field of Classification Search
CPC .............. F16B 25/106; F16B 25/0057; F16B 25/0015; F16B 35/065; F16B 25/0047
USPC ................. 411/308–311, 423, 386, 393, 399, 411/387.1–387.8, 411–414
See application file for complete search history.

(56) References Cited

U.S. PATENT DOCUMENTS

| | | | | |
|---|---|---|---|---|
| 42,475 | A * | 4/1864 | Harvey | 411/415 |
| 196,309 | A * | 10/1877 | Pierce | 411/414 |
| 362,833 | A * | 5/1887 | Harvey | 411/414 |
| 449,887 | A * | 4/1891 | Rogers | 411/411 |
| 3,323,402 | A * | 6/1967 | Gowen, Jr. et al. | 411/411 |
| 3,903,784 | A * | 9/1975 | Dekker | 411/399 |
| 3,965,793 | A | 6/1976 | Roser | |
| 4,527,932 | A | 7/1985 | Onasch et al. | |
| 4,642,964 | A * | 2/1987 | Kellison | 52/699 |
| 4,861,210 | A * | 8/1989 | Frerejacques | 411/411 |
| 5,249,882 | A * | 10/1993 | Nagoshi et al. | 411/399 |
| 5,516,248 | A * | 5/1996 | DeHaitre | 411/387.2 |

(Continued)

FOREIGN PATENT DOCUMENTS

| | | |
|---|---|---|
| CN | 86 2 08237 U | 9/1987 |
| EP | 0 501 519 A1 | 9/1992 |

(Continued)

*Primary Examiner* — Gary Estremsky
(74) *Attorney, Agent, or Firm* — Dickstein Shapiro LLP

(57) ABSTRACT

A low energy wood screw that may be inserted quickly and using less energy than conventional screws. In various embodiments, the screw may include a countersunk head having a recess for accommodating a driving tool, a tapered neck, a plurality of crown ribs extending over the head and neck, a lubricating coating, main threads with a large thread lead, and lower threads having an asymmetrical profile and extending onto a gimlet point.

25 Claims, 3 Drawing Sheets

(56) References Cited

U.S. PATENT DOCUMENTS

| | | | |
|---|---|---|---|
| 5,544,993 A * | 8/1996 | Harle | 411/414 |
| 5,570,983 A * | 11/1996 | Hollander | 411/386 |
| 5,683,217 A * | 11/1997 | Walther et al. | 411/399 |
| 5,704,750 A * | 1/1998 | Bartos et al. | 411/411 |
| 5,772,376 A * | 6/1998 | Konig | 411/399 |
| 6,000,892 A * | 12/1999 | Takasaki | 411/413 |
| 6,050,765 A * | 4/2000 | McGovern et al. | 411/387.2 |
| 6,394,725 B1 * | 5/2002 | Dicke | 411/399 |
| 7,682,118 B2 * | 3/2010 | Gong et al. | 411/387.1 |
| 2005/0186047 A1 * | 8/2005 | Sakamoto | 411/308 |
| 2007/0269287 A1 * | 11/2007 | Runge et al. | 411/378 |
| 2008/0025816 A1 * | 1/2008 | Chen et al. | 411/387.1 |
| 2008/0145182 A1 * | 6/2008 | Gstach | 411/403 |
| 2009/0047095 A1 * | 2/2009 | Pritchard | 411/411 |

FOREIGN PATENT DOCUMENTS

| | | |
|---|---|---|
| FR | 2 786 229 A1 | 5/2000 |
| GB | 2 428 761 B | 4/2008 |
| WO | WO 00/31423 A1 | 6/2000 |

* cited by examiner

LOW ENERGY SCREWS FOR WOOD AND SIMILAR MATERIALS

BACKGROUND

The present invention relates generally to threaded fastening systems. In particular, the present invention relates to a screw for penetrating and securing a work-piece.

Screws are commonly-used mechanical woodworking fasteners, primarily used to connect one work-piece made from wood or similar materials, for example, alternative wood materials, to another similar work-piece. Carpenters and other woodworkers often use power driving tools, such as battery powered electric drills and battery-powered electric screwdrivers to install such screws. The use of battery-powered driving tools to drive the screws is advantageous because it eliminates the need for electric power cords. This allows use of the power tool at distances and places where the use of an electric power cord would be impractical, such as in locations remote from a power source, or would be dangerous, such as in wet or hazardous locations, or would be otherwise undesirable.

One drawback of battery powered driving tools is the need to re-charge the batteries frequently, especially when the battery has a high usage and the charging memory diminishes. This limits the number of screws that can be driven from a single battery charge. Screws that have slow insertion times with high drive torque driving requirements increase the time required to complete a structure or project due to the both the time required to drive the screws and the time required to recharge or replace batteries more frequently.

What is needed is a screw that may be inserted more quickly with lower torque, and using less energy than screws known in the art.

SUMMARY

The present inventions provide a screw that may be inserted quickly and with less energy. In various embodiments the screw includes a head having a recess for accommodating a driving tool, a shank extending from the head to a gimlet point tip, the shank having a tapered the neck, main threads, lower threads, and a point. A plurality of crown ribs extend outwardly from the head and neck, The main threads have a lead of between about 1.6 to about 2.0 times the lead of a standard screw thread. The main threads are arranged between the neck and the lower threads, and have a thread form including an outer tip having a substantially linear profile and a rounded root having a concave profile The lower threads are arranged between the main threads and the point tip, and have an asymmetrical thread form profile.

In various embodiments, the screw includes an unthreaded body portion arranged between the main threads and the neck.

In various embodiments, the main threads and the lower threads are right-handed.

In various embodiments, the head taper angle is steeper than the taper of the neck.

In various embodiments, at least one of the plurality of ribs has a linear tapered profile, wherein at least one of the plurality of ribs includes an outer edge extending from the head diameter to the lower extent of the neck and includes two flank surfaces extending from the edge to the head and neck.

In various embodiments, the plurality of ribs consists of eight ribs.

In various embodiments, the concave profile of the main thread root form is an arc of a circle.

In various embodiments, the main threads and the lower threads meet to make a continuous thread start.

In various embodiments, the main thread linear tip height is about 32% to about 52% of the main thread height.

In various embodiments, the main thread linear tip height is about 42% of the main thread height.

In various embodiments, the lower thread extends towards the head farther than the point.

In various embodiments, the intersection point of the rounded root with the minor diameter shank surface is located at a distance from a central axis of the main thread that is about 90 to 110% of a height of the main thread.

In various embodiments, the main thread tip has a thread angle of between about 20 to 40 degrees.

In various embodiments, the main thread tip has a thread angle of about 30 degrees.

In various embodiments, crests of the threads of the lower threads are arranged on a convex curve of the asymmetrical profile.

In various embodiments, the screw includes a lubricating coating, which may be a water soluble wax.

In various embodiments, the screw is metric size 5×50 and the energy required to insert the screw into a Beech wood work-piece is less than about 90 pound-inch-second.

In various embodiments, the energy required to insert the screw into a Beech wood work-piece is less than about 80 pound-inch-second.

In various embodiments, the energy required to insert the screw into a Beech wood work-piece is about 53 pound-inch-second.

These and other features and advantages of the invention will be more clearly understood from the following detailed description and drawings of preferred embodiments of the present invention.

DETAILED DESCRIPTION

Figure 1:
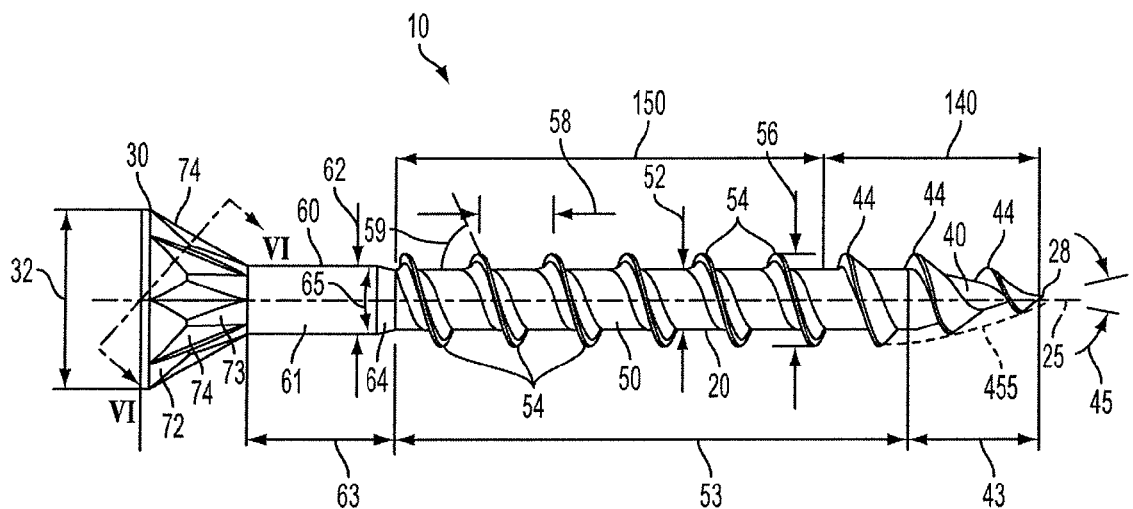
FIG. 1 is a side view of a wood screw according to a preferred embodiment of the present invention.

Refer now to FIG. 1 there being shown a threaded fastener or screw, generally designated by reference numeral 10, according to a preferred embodiment. The screw 10 for use to connect one work-piece made from wood or similar materials, for example, alternative wood materials, to another similar work-piece, but may be referred to herein simply as a wood screw. The screw 10 includes a shank 20 extending along an axis 25 between a head 30 and a point tip 28. The shank 20 includes a neck 73, an unthreaded body 60, a threaded main portion 50, and a threaded point 40. A number of ribs 74 extend outwardly from the head 30 and neck 73, as described in more detail below. The main threaded portion 50 has a length 53 and a minor diameter 52. The threaded point 40 has a point length 43 and a minor diameter 41 that tapers from the main portion 53 to the point tip 28. The unthreaded body 60 has a body length 63 and a body diameter 62.

In the illustrated embodiment, the screw 10 has right-hand upper main threads 54 transitioning as a continuous thread to right-hand lower threads 44. The upper threads 54 have a profile different from the profile of the lower threads 44, for performing different functions as described further below. As shown, the transition from the upper threads 54 to the lower threads 44 occurs within the length 53 of the main threaded portion 50. The threads 54 extend over length 150 and the lower threads 44 extend over length 140. Moreover, the outer surfaces of the threads 54 and 44 and the body 60 of the shank 20 have a friction-reducing coating.

As discussed below, the combination of the configurations of the various features of the low energy screw 10 have been found through empirical trials to significantly reduce the amount of torque and/or energy required to drive in the low energy screw as compared to a standard screw.

Also, slow screw insertion times with high drive torque increases the time required to insert each screw and thus the time for workers to complete a structure or project. Because the low energy screw 10 drives easily, for a given power tool applying a driving torque, the drive speed is found to be significantly higher for the low energy screws as compared to a conventional screw. Consequently, the higher drive speed may increase the likelihood that the head 30 will be driven into the work-piece too far below the surface of the work-piece. The crown ribs 74 of the low energy screw 10 have been found to decrease the speed of the screw 10 upon engaging the work-piece, allowing the operator more time to react and let off the trigger of the power tool in order to achieve insertion of the screw 10 to the desired depth, such as flush with the surface of the work-piece.

The upper threads 54 have a pitch 58. The lower threads 44 have a different form profile for improved starting but have substantially the same pitch, so both threads 54 and 44 advance the screw 10 at substantially the same rate. The illustrated embodiment has a single thread start (individual thread). Thus the thread pitch is equal to the thread lead. For such single thread start screws, the terms "thread pitch" and "thread lead" are commonly used interchangeably and the term pitch is used herein. However if an embodiment of the low energy screw were to have more than one start, then the use of the term "pitch" herein should be construed to mean "lead" as the advancement of the screw into the work-piece for a given turn is a relevant feature. A single start is preferable for the low energy screw because one or more additional starts would add resistance to drive-in without any change in the lead for a given helix angle. The lead 58 is greater than the lead for standard wood screws of similar sizes.

The reference to "standard wood screws" herein is to wood screws made according to accepted industry standards. For example, Deutsches Institut far Bautechnik (DIBt) (German Institute for Building Technology) is an accreditation agency of the German federal government, with an office in Berlin, that grants allgemeine bauaufsichtliche Zulassungen (national technical approvals) for construction products on the basis of the building laws of the Laender of the Federal Republic of Germany. The company SPAX International GmbH & Co. KG of Ennepetal, Germany and its affiliates (SPAX) markets screws in Europe and has obtained DIBt approval for certain wood screws, the dimensional specifications of which are set out at Anlage 9 zur allgemeinen bauaufsichtliche Zulassungen Z-9, 1-235 vom 23.08.2002 (23 Aug. 2002). Such specifications have become widely followed in Europe and have become a standard there, and with respect to the relevant dimensions for the purposes hereof shall define the European standard wood screw. Also, Taiwan Shan Yin International. Co., Ltd., of Kaohsiung City, Taiwan, publishes a chipboard screw specification SY-CB-F001-0B in accordance with DIN 7505 that has become widely followed in Taiwan and has become a standard there, and with respect to the relevant dimensions for the purposes hereof shall define the Taiwan chipboard standard screw.

The Table shows certain specified dimensions and ratios for some embodiments of low energy wood screws A. All the Table dimensions are in millimeters (mm). Those dimensions are: the major thread diameter of the main thread (OD); the minor diameter of the main thread (ID); the thread depth (TD), which equals (OD minus ID) divided by two; and the pitch. The ratios are: the ratio of thread depth to major diameter (TD % of OD), which equals (TD divided by OD) times 100; and the ratio of pitch to major diameter (Pitch % of OD), which equals (pitch divided by OD) times 100. The OD is also used for indicating the size of the screw, along with the screw length (typically the distance from the tip to the neck). Thus, in metric sizes, a 5×50 screw has a 5 mm OD and a 50 mm length. The size indication shown in the Table includes just the OD component.

The Table also shows the same dimensions and ratios for three commercially available conventional wood screws B, C, and D, that are standard or near-standard.

TABLE

| Size | OD | ID | TD | TD % of OD | Pitch | Pitch % of OD |
|------|------|------|------|------------|-------|---------------|
| Low Energy Screws A | | | | | | |
| 3.00 | 3.00 | 1.92 | 0.54 | 18.0% | 1.78 | 59.3% |
| 3.50 | 3.50 | 2.24 | 0.63 | 18.0% | 2.08 | 59.4% |
| 4.00 | 4.00 | 2.56 | 0.72 | 18.0% | 3.20 | 80.0% |
| 4.50 | 4.50 | 2.88 | 0.81 | 18.0% | 3.60 | 80.0% |
| 5.00 | 5.00 | 3.20 | 0.90 | 18.0% | 4.00 | 80.0% |
| 6.00 | 6.00 | 3.84 | 1.08 | 18.0% | 4.80 | 80.0% |
| Conventional Screws B | | | | | | |
| 3.00 | 3.00 | 2.10 | 0.45 | 15.0% | 1.50 | 50.0% |
| 3.50 | 3.50 | 2.40 | 0.55 | 15.7% | 1.80 | 51.4% |
| 4.00 | 4.00 | 2.80 | 0.60 | 15.0% | 2.00 | 50.0% |
| 4.50 | 4.50 | 2.90 | 0.80 | 17.8% | 2.20 | 48.9% |
| 5.00 | 5.00 | 3.40 | 0.80 | 16.0% | 2.50 | 50.0% |
| 6.00 | 6.00 | 3.80 | 1.10 | 18.3% | 3.00 | 50.0% |
| Conventional Screws C | | | | | | |
| 3.00 | 3.00 | 1.90 | 0.55 | 18.3% | 1.35 | 45.0% |
| 3.50 | 3.50 | 2.20 | 0.65 | 18.6% | 1.60 | 45.7% |
| 4.00 | 4.00 | 2.50 | 0.75 | 18.8% | 1.80 | 45.0% |
| 4.50 | 4.50 | 2.70 | 0.90 | 20.0% | 2.00 | 44.4% |
| 5.00 | 5.00 | 3.00 | 1.00 | 20.0% | 2.20 | 44.0% |
| 6.00 | 6.00 | 3.70 | 1.15 | 19.2% | 2.60 | 43.3% |
| Conventional Screws D | | | | | | |
| 3.00 | 3.00 | 1.90 | 0.55 | 18.3% | 1.35 | 45.0% |
| 3.50 | 3.50 | 2.15 | 0.68 | 19.3% | 1.60 | 45.7% |
| 4.00 | 4.00 | 2.50 | 0.75 | 18.8% | 1.80 | 45.0% |
| 4.50 | 4.50 | 2.70 | 0.90 | 20.0% | 2.00 | 44.4% |
| 5.00 | 5.00 | 3.00 | 1.00 | 20.0% | 2.20 | 44.0% |
| 6.00 | 6.00 | 3.60 | 1.20 | 20.0% | 2.60 | 43.3% |

The conventional screw B is a European standard screw from SPAX. The conventional screw C is a Taiwan chipboard standard screw. The conventional screw D is a near-standard screw from the company Joseph Dresselhaus of Herford, Germany. As can be seen from the Table, for a given size (OD) of screw, the low energy screws A have comparable ID, TD and TD % of OD as compared to the conventional screws B, C and D. However, the low energy screws A have a significantly larger pitch than the conventional screws B, C and D. According to the Taiwan chipboard standard, the thread pitch for a metric size 5 (5.0 mm) wood screw is 2.2 mm.

The relatively large pitch 58 of the threads 54 as compared to a standard screw thread pitch yields a relatively aggressive and high helix angle and quickens insertion time for a given speed of turning because the screw advances further into the work-piece with each turn.

Conventionally, in order to lower resistance and drive-in torque the thread depth would be made shallow. However, shallower threads may have diminished "pull-out" resistance. In the low energy screw 10, the depth 57 of threads 54 may be similar to that of a standard screw of similar size, so as to not suffer any decrease in pull-out caused by shallow threads. In the low energy screw 10, the large lead 58 allows for a smooth core shank 20 to lower driving resistance while preserving pull-out resistance.

However, if the pitch is increased too much, the required drive torque may increase too much and so much more material is moved that friction is undesirably increased. In one embodiment, for a size 5 screw the threads 54 may have a pitch 58 of about 4.0 mm. In another embodiment, the pitch 58 may be about twice that of European standard wood screws and Taiwan chipboard standard screws.

"Pull-out" occurs when forces exerted to move apart the fastened work-pieces are sufficient to overcome the holding force of the screw threads engaged in the work-pieces and at least partially pull the screw out of the work-piece. "Pull-through" occurs when the forces cause the head of the screw to be pulled into the work-piece. "Back-out" occurs when forces on the fastened work-pieces cause the screw to turn to at least partially unscrew from the work pieces. Forces causing back-out can occur over long times, such as from expansion and contraction of the work-pieces caused by temperature changes, or from swelling and shrinkage caused by wetting and drying, or vibrational or other forces caused by use of the structure that includes the work-pieces.

The threads 54 also have a helix angle 59 that is a function of the pitch 58 and the shank diameter 52 of the main threaded portion 50. To allow the screw to be driven in a shorter time without increasing drive torque, the helix angle 59 preferably may be from about fourteen to about twenty-two degrees for a size 5.0 mm OD screw. In another embodiment, the helix angle 59 may preferably be about 20 degrees for a size 5.0 mm OD screw.

Figure 5:
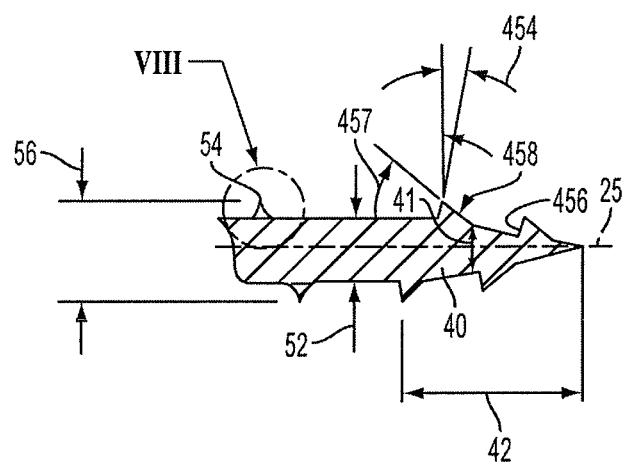
FIG. 5 is a view taken along section line V-V of FIG. 3.
Figure 8:
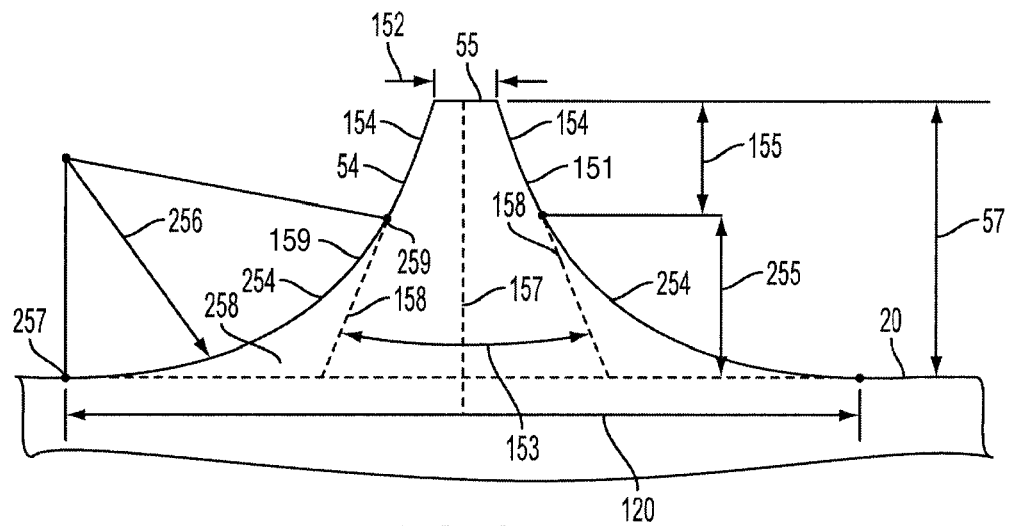
FIG. 8 is a detail view of the area VIII of FIG. 5.

FIG. 8 is a detail view of the form of thread 54 shown in area VIII of FIG. 5. The truncated crest 55 has a width 152. The thread 54 has an axis 157 perpendicular to the screw axis 25 and has a thread depth 57. The thread depth 57 is about that of the normal industry standard. The thread depth 57 as described in the various embodiments contributes to improved resistance to the screw 10 pulling out of a work-piece in which it is driven.

As shown in FIG. 8, the thread 54 has a large radius root. The leading flank 151 and following flank 159 each are made up of two sections: an outer linear section 154 and an inner curved section 254 having a curved profile of the rounded root form. The outer linear section 154 has a height 155 and extends from the crest 55 to the uppermost end of the inner curved section profile 254. The outer linear sections 154 form a thread angle 153. In various embodiments, the thread angle 153 preferably may be from about twenty to about forty degrees, or more preferably about thirty degrees. In the embodiment shown, the leading flank angle is about equal to the following flank angle for threads 54. The curved section 254 has a height 255 and extends tangent from the lowermost end of the outer surface of the linear section 154 at point 259, to the point 257 tangent to the shank 20 having a minor diameter 52. The thread 54 has a width 120 at the base of the thread 54 extending from the lowermost end of the curved section profile 254 on the leading flank 151 of the thread 54 to the lowermost end of the curved section 254 on the following flank 159 of the thread 54.

The profile of the curved section 254 defines a cross section 258 located between the shank 20 and an axis line 158 drawn along the profile of the linear section 154 to the shank 20. The line 158 corresponds to an unrounded flat root form, similar to a conventional screw. In various embodiments, the curve 254 may be defined by a radius for an arc of a circle, ellipse, or an arc of some other type of curve. In other embodiments, the curve 256 may be a series of steps formed from straight or curved lines. In various embodiments, the lower end 257 of the curved section 254 may be located at a distance from the central axis 157 of the thread 54 that is preferably from about ninety to about one hundred ten percent of the height 57 of the thread 54. The thread tip height 155 is preferably from about 32% to about 52%, and more preferably about 42%, of the thread depth 57.

The pressure exerted on the work-piece material by section 258 of the long radius root form serves to compact the work-piece material surrounding the screw 10 so cavity formation is decreased, which cavities may leave less material in shear and decrease holding power. The compacted homogeneous work-piece material resists pull-out and back-out. As the ratio of thread tip height 155 to a given thread depth 57 increases, the size of areas 258 correspondingly decreases resulting in a smaller rounded root form, and consequently less compacting of the work-piece material, thus decreasing the holding force.

The low energy screw 10 has an improved self-drilling starting point 40 that can be formed at the same time as the threads 54 are rolled, thus without requiring the added cost of a secondary operation, such as required to manufacture the conventional shank slotted drill point. The point 40 has a sharp point tip 28 with threads 44 having a special asymmetric thread form and extending up to the threads 54. The lower threads 44 extend from the main threaded portion 50 to the point tip 28, forming a gimlet type point. The point tip 28 is essentially a sharp end to the shank 20 and may be a "needle sharp" end. The threads 54 segue into the threads 44 in the main threaded portion 50 and run to the point tip 28. The major diameter of the threads 44 decreases at the tapered tip 40 and comes to an essentially sharp end at the point tip 28.

The threads 44 are thread-forming threads that reduce the need to pre-drill holes in a work-piece. The threads 44 have a thread form profile design to allow the point tip 28 to commence penetration while the progressive widening of the threads 44 prevents the work-piece material located between and holding the threads 44 from crumbling. The holding material is thus left more homogeneous to resist thread stripping and "pull-out" loads. The threads 44 have an asymmetric thread form profile. The crests of the threads 44 conform to a curved profile 455 as shown in FIG. 1 to allow for an easy lead in to start driving the screw 10. In one embodiment, the lower three threads of the screw 10 are asymmetric threads 44. The angle 454 of the following (or trailing, or reverse) thread flank 456 of the threads 44 may be at or near perpendicular to the axis 25 for maximum pull out resistance. The angle 457 of the leading (or forward) thread flank 458 may be greater than that of the angle 454 of the following thread flank 456 for easier insertion into a work-piece and greater resistance to pull-out. I have found that starting the screw 10 with point 40 is easier and faster than starting a machined or struck drill pointed screw.

The radius root design allows the sharp tip to commence penetration and the progressive widening of the thread ensures that the holding material between the threads is not crumbled and thus left homogeneous to resist thread stripping and "pull-out" loads.

The screw 10 optionally includes an unthreaded body portion 60 having a smooth surface 61, a diameter 62, and a length 63. In various embodiments, the diameter 62 of the unthreaded body portion 60 may be from about zero to about one third of the screw length, for screw lengths of forty mm and longer. In the illustrated embodiment, the body portion 60 diameter 62 is slightly greater than the minor diameter 52 of the main portion 50 of the shank 20, but smaller than the major thread diameter 56 of the threads 54. In this case, a tapered portion 64 may be located on the body 60 transitioning to the main portion 50. The angle 65 of the tapered portion 64 may vary depending on the length of the transition portion 64 and the difference between the main portion diameter 52 and the body diameter 62. The diameter 62 of the body 60 should not be so large as to substantially inhibit insertion of the screw into the work-piece. Alternatively, the body diameter 62 can be equal to or smaller than the diameter 52 of the main portion 50.

Figure 2:
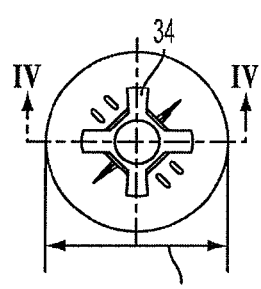
FIG. 2 is an end view of the head of the screw of FIG. 1.
Figure 4:
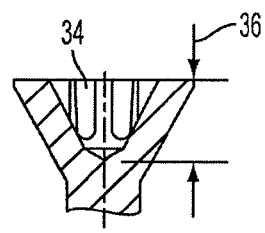
FIG. 4 is a view taken along section line IV-IV of FIG. 2.

The head 30 of the screw 10 may be seen in greater detail in FIGS. 2 and 4. The head 30 has a diameter 32, and includes a recess 34 having a depth 36 (FIG. 4). The recess 34 is configured to accommodate a driving tool for rotating the screw 10. The recess 34 may have a shape such as slotted, cruciform shaped, hex shaped, or the like to enable a driving tool to fit securely in the recess 34. In one embodiment, the recess may be configured to accommodate a driver that in combination provide "stick-fit," namely, sufficient friction between the recess and driver to hold the screw onto the driver while it is being placed in position to be driven into the work-piece. A single-handed patented "stick-fit" driving system is available under the brand PoziSquare® as described in U.S. Pat. Nos. 6,890,139, 6,852,037, 6,843,729 and/or 6223634. The PoziSquare® brand drive system holds the screw in-line with the driver with little or no wobble.

Figure 7:
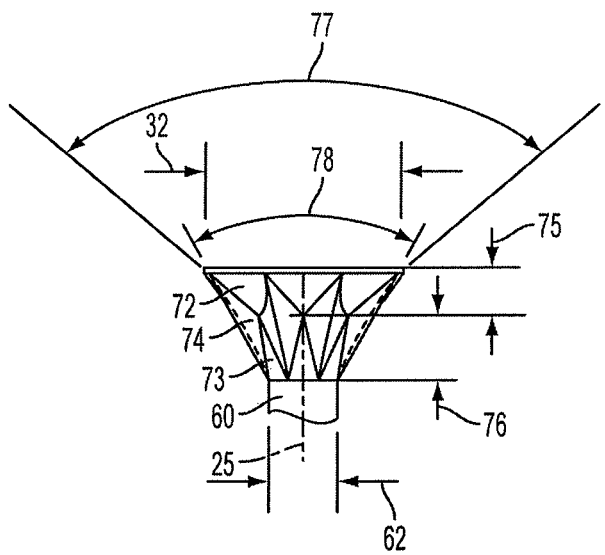
FIG. 7 is a partial side view of the screw of FIG. 1.

As illustrated in FIGS. 1 and 7, the head diameter 32 is greater than the major thread diameter 56 and the body diameter 62. The head diameter is sized comparable to standard screws to inhibit pull-through. A neck 73 extends between the body 60 and the head 30. In the illustrated embodiment, the head 30 includes a first tapered portion 72 having a height 75. The neck 73 has a height 76 and tapers from the head 30 to the body portion 60 of the shank 20. In the embodiment shown, the head tapered portion 72 has a steeper angle 77 than the neck 73. In another embodiment, the neck 73 may be parallel to the axis 25. The neck 73 is tapered for strength, to accommodate the recess, and so that in use, as the neck enters a work-piece, the work-piece material will gradually compress to more tightly hold the screw 10 against back-out. The desirable angle or degree of taper may depend upon the compressibility or the characteristic of the work-piece.

Figure 3:
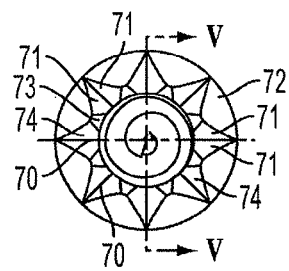
FIG. 3 is an end view of the point of the screw of FIG. 1.
Figure 6:
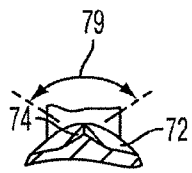
FIG. 6 is a view taken along section line VI-VI of FIG. 1.

The head and neck also include a number of ribs 74 extending between the head 30 at its outer diameter and the body portion 60. In the embodiment shown in FIGS. 1, 3 and 6, the ribs 74 have a tapered profile formed by a straight line outer edge 70 extending from the head 30 to the body portion 60 at an angle 78. The crown ribs 74 have opposed rib flanks 71 extending from the edge 70 inwardly at an angle 79 to the head surface 72 and the neck 73. In other embodiments, the ribs 74 may have a profile that is stepped, curved, or otherwise shaped. The screw 10 may preferably include from six to ten ribs. As shown in FIG. 3, the screw 10 may preferably include eight ribs 74. In other embodiments, a greater or lesser number of ribs may be included. As the number of ribs is decreased, more material is chewed by the ribs and the wood may splinter. As the number of ribs is increased, the ribs are less likely to engage the wood.

These aggressive ribs 74 yield a number of performance improvements. First, the high speed insertion of the low energy screw can lead to lack of depth control of the driven screw. The crown ribs 74 slow down the screw as it countersinks itself giving the operator good control. Second, the ribs also provide good clean countersinking without splinters around the head. A further advantage is that the ribs embed themselves in the countersink and add resistance to vibrational loosening of the screw, or back-out.

The ribs 74 of the various embodiments act to slow down the screw 10 as it countersinks itself, thus giving the operator better control. The ribs 74 reduce or eliminate a phenomenon known as "slam torque" caused by the high insertion speed and provide a more regular depth of the seated screw 10. The ribs 74 also provide clean countersinking without splinters around the head 30 and reduce or eliminate the screw head sitting above the fitting countersink when screw 10 is used in hardware fittings. A further advantage is that the ribs 74 embed themselves in the work-piece to resist vibration loosening of the joint between the two work-pieces and to resist back-out of the screw by resisting turning in the reverse direction.

The screw 10 is manufactured from a blank that may initially be uniform in diameter. The blank, which may be made form steel, aluminum, or other material, is deformed by a thread rolling machine to achieve the form illustrated in FIG. 1. In one embodiment, the screw 10 may be formed from SAE 10B22 steel so only neutral hardening need be used and therefore eliminate the need for case hardening and subsequent expensive de-embrittlement baking. In another embodiment, the screw 10 may be formed from hardenable Stainless Steel AISI 410 or SAE 305 range. The blank may be rolled in a first direction to form the upper threaded portion 50. The head 30 and the neck 70 may be formed during the above mentioned rolling steps, or during separate rolling steps. Alternatively, the rolling machine may have appropriate dies so that the screw 10 can be manufactured in one rolling step. During the rolling process, the threads 54 may receive forging properties that help increase the screw's fatigue strength and loading strength, in a known way.

In one embodiment, the screw may be manufactured such that it is resistant to 1,000 hour salt spray and cycles of "Kesternich" testing according to industry standards. Embodiments for use in indoor applications may include 0.0002 to 0.0004 inch zinc and yellow dichromate passivation. To decrease the friction between the screw 10 and a work-piece, the screw 10 may have a lubricating coating, for example, water soluble wax, such as FUCHS water soluble Gleitmo® wax. The low energy screw A of the Table has such a coating.

Figure 9:
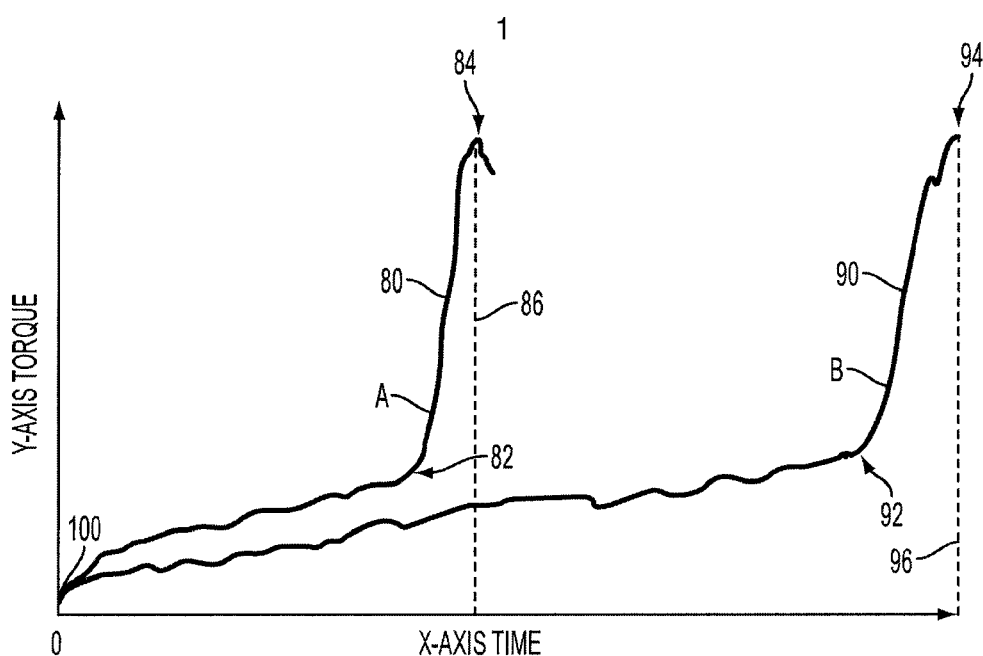
FIG. 9 is a graph of torque versus time for the insertion of two wood screws.

FIG. 9 shows a graph of torque on the y-axis versus time on the x-axis for the insertion of both a metric size 5×50 low energy screw A according to the embodiment of the Table (line 80) and a metric size 5×50 conventional wood screw B of the Table (line 90). The conventional wood screw B was selected for the comparison shown in the graph of FIG. 9 because the conventional wood screw B was determined to have the best driving efficiency compared to many other screws from the prior art, including conventional wood screws C and D of the Table. The low energy screw A and the conventional wood screw B were inserted into Beech wood, and the torque produced by the driving tool was recorded for each interval of about 0.001 seconds (sec) during the time the respective screws were driven into the wood. Both curves 80 and 90 start when the torque is first sensed at about five pound-inch (lb-in). Points 82 and 92 are when the heads of the screws start to set in the work-pieces and torque starts to increase rapidly. Points 84 and 94 are when the heads of the screws are fully set in the work-pieces and the operator then commences to stop the driving tool.

In essence, the respective areas under the curves 80 and 90 from the y-axis to the lines 86 and 96 represent the total energy required by the driving tool to drive the respective screws. The total energy used to drive the low energy screw A was calculated to be about 53.5 lb-in-sec, while the total energy to drive the conventional screw B was about 101 lb-in-sec. The graph also shows that the low energy screw A was inserted into the wood about 40% faster than the conventional screw B. The low energy screws insert quickly because of the aggressive thread lead and the decrease in friction at higher speeds due to the combination of features.

In a separate test, metric size 5×50 low energy screws A according to the Table were driven into tanalised (pressure treated with Tanalith E wood preservative) pine fence posts using a Festool® model T15+3 driving tool having a Festool Li-Ion 8PS 15Li battery. 878 of such low energy screws were driven on a single full battery charge. The same driving tool was only able to drive 660 metric size 5×50 conventional wood screws B of the Table into the tanalised pine fence posts on a single full battery charge. As shown by this test, 33% more low energy screws A were driven on the same battery charge than the conventional screws B. Moreover, the low energy screws A were driven quicker and easier than the conventional screws B with less fatigue on the operator.

The above description and drawings are only illustrative of preferred embodiments of the present inventions, and are not intended to limit the present inventions thereto. Any subject matter or modification thereof which comes within the spirit and scope of the following claims is to be considered part of the present inventions.

The invention claimed is:

1. A low energy wood screw comprising:
   a countersunk head having a recess for accommodating a driving tool;
   a shank extending from the head to a point tip, the shank having a tapered neck, main threads, lower threads, and a point;
   a plurality of crown ribs extending outwardly from said head and neck;
   wherein the main threads have a lead that is from about 60 percent to about 80 percent of the outer diameter;
   wherein the main threads are arranged between the neck and the lower threads, and wherein the main threads have a thread form including an outer tip having a substantially linear profile and a rounded root having a concave profile; and
   wherein the lower threads are arranged between the main threads and the point tip, and wherein the lower threads have an asymmetrical thread form profile.

2. The screw of claim 1, further comprising an unthreaded body portion arranged between the main threads and the tapered neck.

3. The screw of claim 2, wherein the unthreaded body diameter is greater than the main thread minor diameter.

4. The screw of claim 1, wherein the lower threads have a leading flank angle greater than its following flank angle.

5. The screw of claim 1, wherein the lower threads are thread-forming threads.

6. The screw of claim 1, wherein the main threads and the lower threads are right-handed.

7. The screw of claim 1, wherein the head is a tapered head and the head taper angle is steeper than the taper of the neck.

8. The screw of claim 1, wherein at least one of the plurality of ribs has a linear tapered profile.

9. The screw of claim 1, wherein at least one of the plurality of ribs includes an outer edge extending from the head diameter to the lower extent of the neck and includes two flank surfaces extending from the outer edge to the head and neck.

10. The screw of claim 1, wherein the plurality of ribs consists of from six to ten ribs.

11. The screw of claim 1, wherein the plurality of ribs consists of eight ribs.

12. The screw of claim 1, wherein the concave profile of the main thread rounded root form is an arc of a circle.

13. The screw of claim 1, wherein the main threads and the lower threads are continuous to make a continuous thread start.

14. The screw of claim 1, wherein the main thread linear tip height is about 32% to about 52% of the main thread height.

15. The screw of claim 1, wherein the main thread linear tip height is about 42% of the main thread height.

16. The screw of claim 1, wherein the lower threads extend away from the point tip towards the head and beyond a transition from the point to a shank minor diameter.

17. The screw of claim 1, wherein an intersection point of the rounded root with the shank surface is located at a distance from a central axis of the main thread that is about 90 percent to about 110 percent of a height of the main thread.

18. The screw of claim 1, wherein the main threads have a thread angle of from about 20 to about 40 degrees.

19. The screw of claim 1, wherein the main threads have a thread angle of about 30 degrees.

20. The screw of claim 1, wherein crests of the lower threads are arranged on a convex curve of the asymmetrical profile.

21. The screw of claim 1, wherein the screw includes a lubricating coating.

22. The screw of claim 21, wherein the coating is a water soluble wax.

23. The screw of claim 13, wherein the point tip is a gimlet point tip.

24. The screw of claim 13, wherein the screw comprises a single thread start.

25. The screw of claim 1, wherein the substantially linear profile is a linear profile.

\* \* \* \* \*